United States Patent
Murdock et al.

(10) Patent No.: US 8,941,365 B2
(45) Date of Patent: Jan. 27, 2015

(54) METHODS AND APPARATUS TO IMPROVE POWER FACTOR AT LIGHT-LOAD

(75) Inventors: Matthew Thomas Murdock, Nashua, NH (US); Ulrich B. Goerke, Dover, NH (US)

(73) Assignee: Texas Instruments Incorporated, Dallas, TX (US)

( * ) Notice: Subject to any disclaimer, the term of this patent is extended or adjusted under 35 U.S.C. 154(b) by 551 days.

(21) Appl. No.: 13/211,123

(22) Filed: Aug. 16, 2011

(65) Prior Publication Data
US 2013/0043846 A1 Feb. 21, 2013

(51) Int. Cl.
*G05F 5/00* (2006.01)
*H02M 1/42* (2007.01)
*H02M 1/00* (2006.01)

(52) U.S. Cl.
CPC .... *H02M 1/4225* (2013.01); *H02M 2001/0032* (2013.01); *Y02B 70/126* (2013.01); *Y02B 70/16* (2013.01)
USPC ......................................................... 323/207

(58) Field of Classification Search
USPC .......... 323/205, 207, 222; 363/81, 82, 84, 89, 363/90
See application file for complete search history.

(56) References Cited

U.S. PATENT DOCUMENTS

| | | | | |
|---|---|---|---|---|
| 7,446,517 | B2* | 11/2008 | Chen et al. | 323/284 |
| 7,453,248 | B2* | 11/2008 | Takeuchi | 323/285 |
| 8,040,114 | B2* | 10/2011 | Saint-Pierre | 323/222 |

OTHER PUBLICATIONS

Grote, Figge, Frohleke, Beulen, Schafmeister, Ide, and Bocker, Semi-Digital Interleaved PFC Control with Optimized Light Load Efficiency, Applied Power Electronics Conference and Exposition, Mar. 21, 2009, pp. 1722-1727, (6 pages).

* cited by examiner

*Primary Examiner* — Adolf Berhane
*Assistant Examiner* — Afework Demisse
(74) *Attorney, Agent, or Firm* — William B. Kempler; Frederick J. Telecky, Jr.

(57) ABSTRACT

Methods and apparatus to improve power factor are disclosed. An example method includes detecting power provided to a power factor corrector; detecting power provided by the power factor corrector; and disabling the power factor corrector from correcting a power factor of a load for at least one period when the power provided by the power factor corrector is below a light-load threshold.

18 Claims, 6 Drawing Sheets

METHODS AND APPARATUS TO IMPROVE POWER FACTOR AT LIGHT-LOAD

FIELD OF THE DISCLOSURE

This disclosure relates generally to power factor correction, and, more particularly, to methods and apparatus to improve power factor at light-load.

BACKGROUND

In electric power systems, power consuming loads are connected to power generating devices. While ideal loads are purely resistive, many loads have some level of reactance (e.g., capacitive reactance or inductive reactance.) When a load is reactive, energy storage within the load causes a phase shift between the voltage and current components of the power being provided to the load. This phase shift results in an increase in the current being provided, which in turn results in an increased apparent power supplied to the load compared to the real power that is being utilized by the load. The difference between apparent power and real power is quantified by a displacement power factor. The displacement power factor is one component of the true power factor. Additionally, Total Harmonic Distortion (THD) can contribute significantly to the power factor of a load. THD occurs in nonlinear loads which introduce harmonics into the power drawn from the power generating device. These additional harmonics result in increased apparent power being drawn by the load.

Purely resistive loads have a unity power factor (i.e., a power factor of one), while reactive loads have a power factor of less than unity. Power companies charge based on apparent power and, therefore, charge more for increased levels of apparent power consumption. Thus, loads with a power factor less than unity may be more expensive to operate than loads with a unity power factor for the same real power input to the load.

DETAILED DESCRIPTION

Figure 1:
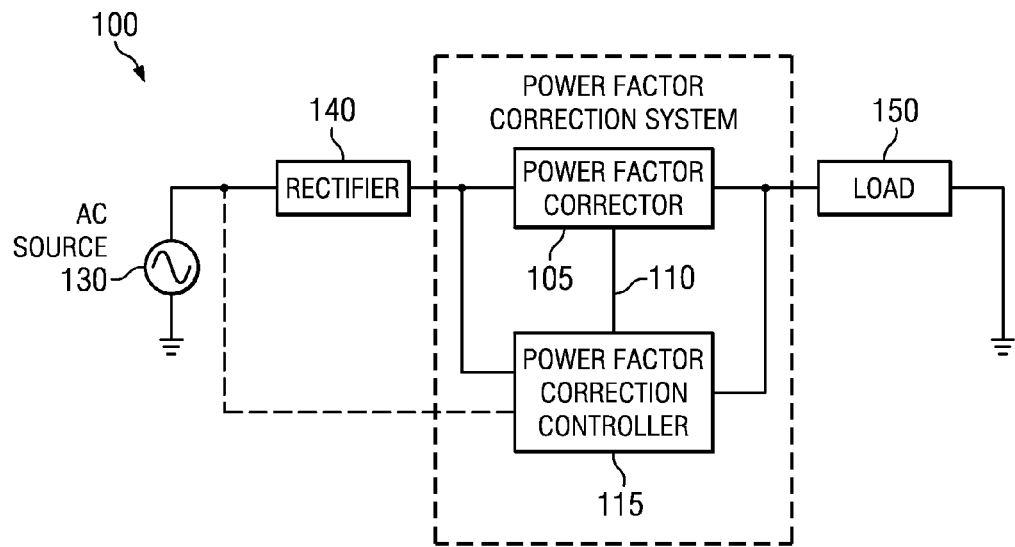
FIG. 1 is a block diagram of an example circuit including a power factor correction system.

Many loads have different power factors. For example, resistive loads such as electric heaters have a power factor close to unity, while reactive loads such as electric motors have a power factor that is less than unity (e.g., 0.8, 0.7, etc.). Typically, devices having a reactance of opposite sign are added to the load to correct the power factor and bring the power factor closer to unity. For example, a bank of capacitors may be added to a large inductive load to bring the power factor closer to unity.

In some examples, the reactance of the load may be constant over a number of variables. For example, the reactance may be constant over time or power consumption levels. However, not all loads exhibit constant reactance. When the reactance of the load is constant (e.g., the load continually exhibits the same reactance) a reactive element of opposite sign can easily be added to the circuit of the load to correct the power factor. When the reactance of the load is non-constant (e.g., the load does not exhibit the same reactance over time, frequency, etc.), alternate methods of correcting the power factor are required such as, for example, active power factor correction.

Switching power supplies, like those typically found in computer power supplies, exhibit a non-constant reactive load. For example, the activation and deactivation of individual devices, components, and/or circuitry within the computer and/or computer power supply may vary the reactance of the load while additionally adding harmonics which can contribute to Total Harmonic Distortion (THD). When the reactance of the load varies, the reactive components of opposite sign added to the load must also vary to correct the power factor of the load.

When the reactance of the load varies, active power factor correction may be necessary to correct the power factor. Active power factor correction may involve switching opposite reactive components (e.g., capacitors, inductors, etc.) into the circuit of the load based on the reactance of the load. In some example circuits the reactance can vary quickly, causing the active power correction circuitry to switch the reactive components into and/or out of the circuit of the load rapidly. Rapidly switching power factor correction circuitry can result in switching losses and distortion of the power provided to the load. Switching losses result in an increase in apparent power provided to the load.

In addition to power factor caused by reactance of the load, power factor is also dependent on the THD created by the load. When power is provided to the load, it is provided as a sinusoid. When components of the load are activated and deactivated, the sinusoid is disrupted and harmonics are introduced. The harmonics result in extra power being drawn by the load, and cause a lower power factor. It is important not only to address the displacement power factor (based on the phase shift), but to also address the distortion power factor (based on the THD).

In some examples, non-constant reactivity of the load can be caused when the load is light relative to a maximum rating. Light-load conditions may arise when, for example, devices enter power saving modes. Light-load conditions may give rise to other problems, such as poor efficiency and poor Total Harmonic Distortion (THD). For example, while in terms of the displacement power factor (the power factor resulting from a displacement between the voltage and current provided to the load) the power factor of a load might be near unity, the power factor might in fact be far from unity due to the effects of THD. The example power factor correction systems of the examples illustrated below improve efficiency at light-load conditions by reducing the switching losses experienced. Further, THD is decreased at light-load conditions by period enabling modulating the operation of a current loop on a line-cycle basis.

FIG. 1 is a block diagram of an example power factor correction system 100. The example power factor correction system 100 includes a power factor corrector 105 and a power factor correction controller 115. The power factor corrector 105 and the power factor correction controller 115 are connected via a power factor correction enable 110. The power factor correction system 100 of the illustrated example receives power via a rectifier 140 and an alternating current (AC) source 130. In the illustrated example, both the power factor corrector 105 and the power factor correction controller 115 receive power via the rectifier 140; however the power factor correction controller 115 may additionally or alternatively receive power via the AC source 130. The power factor correction system 100 of the illustrated example outputs a rectified power to a load 150.

The power factor corrector 105 of the illustrated example includes an inductor, a transistor, a diode, and a capacitor. Additionally or alternatively, the power factor corrector 105 may include analog components such as resistors and/or digital components such as a microcontroller. Further, the power factor corrector 105 of the illustrated example is a boost topology. However, any other topology might additionally or alternatively be used such as, for example, a buck topology, a flyback topology, a buck-boost topology, etc. Further, in the illustrated example, the power factor corrector 105 is an active power factor corrector. However, the power factor corrector 105 could be a passive power factor corrector, or alternatively, might not be present at all.

The power factor correction controller 115 of the illustrated example is an Application Specific Integrated Circuit (ASIC). However, the power factor correction controller 115 may additionally or alternatively comprise any other processing circuitry such as, for example, a microprocessor, a Digital Signal Processor (DSP), a Field Programmable Gate Array (FPGA), etc. Further, the power factor correction controller 115 may include analog circuitry such as, for example, resistors, inductors, capacitors, etc.

The power factor correction enable 110 of the illustrated example is an electronic interface connecting the power factor correction controller 115 to the power factor corrector 105. The electronic interface of the illustrated example controls a transistor of the power factor corrector 105 to selectively enable and/or regulate power factor correction. However, in alternative implementations the power factor correction controller 115 may be integrated with the power factor corrector 105 such that an enable interface is not necessary. Further, in some implementations, the power factor correction enable 110 might be connected to a relay external to the power factor corrector 105 which may cause AC power to bypass the power factor corrector 105 before being provided to the load 150.

The AC source 130 of the illustrated example is a commercial power source. The AC source provides one hundred and twenty volts alternating at sixty hertz. However, any other power source (e.g., a commercial power source, a non-commercial power source, etc.) utilizing any voltage and frequency may be used.

The load 150 of the illustrated example is a load that exhibits non-constant reactivity. For example, the load 150 may be a computer including a switching power supply. However, the load 150 may represent any type of load such as, for example, a load exhibiting non-constant reactance and/or a load exhibiting constant reactance.

Figure 2:
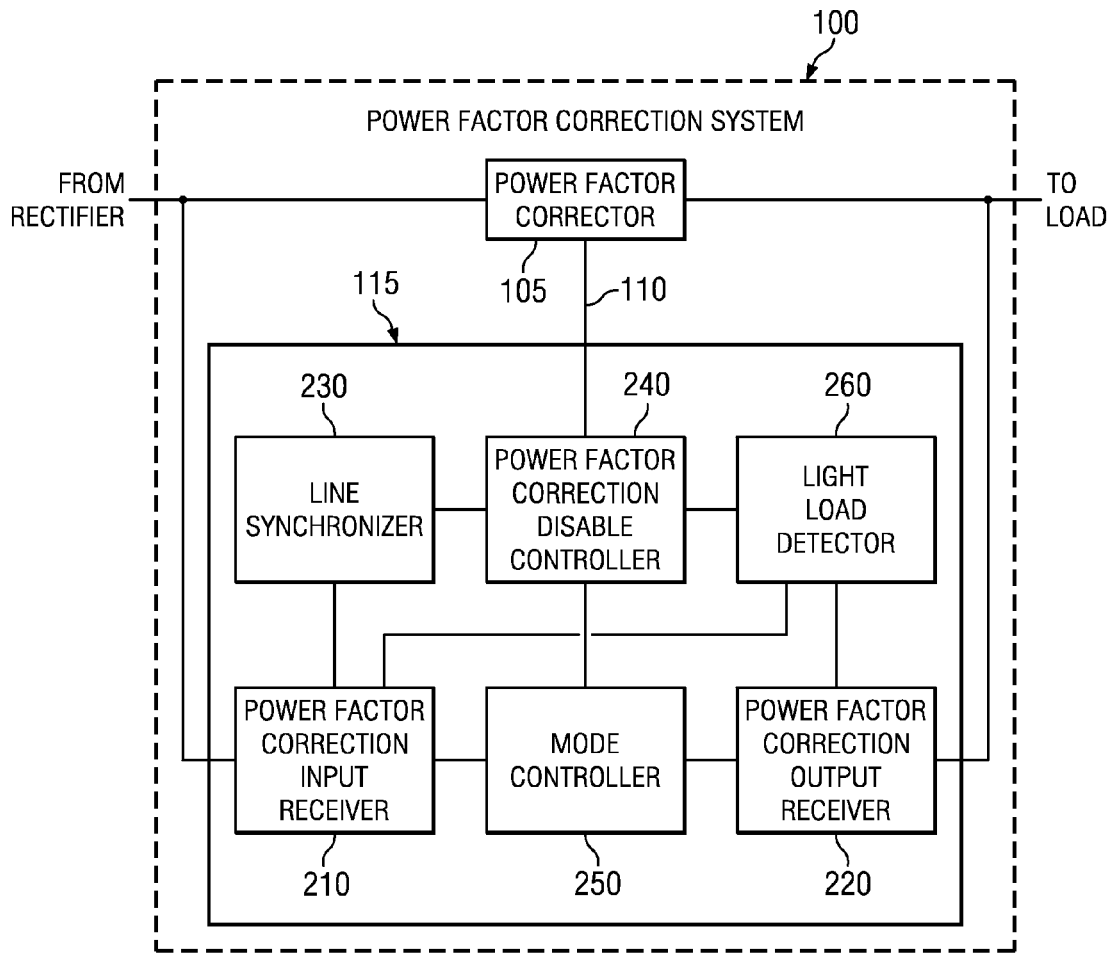
FIG. 2 is a block diagram of the example power factor correction system of FIG. 1.

FIG. 2 is a block diagram of the example power factor correction system 100 of FIG. 1. The power factor correction controller 115 of the illustrated example includes a PFC input receiver 210, a PFC output receiver 220, a line synchronizer 230, a PFC disable controller 240, a mode controller 250, and a light-load detector 260.

The PFC input receiver 210 of the illustrated example receives an input from the rectifier 140. The input received by the PFC input receiver 210 is also tied to the power factor corrector 105. The PFC input receiver 210 forwards the received signal to the line synchronizer 230, the mode controller 250, and the light-load detector 260.

The PFC output receiver 220 of the illustrated example receives an input from the output of the power factor corrector 105. The input received by the PFC output receiver 220 is also tied to the load 150. The PFC output receiver 220 forwards the received signal to the mode controller 250 and the light-load detector 260.

The line synchronizer 230 of the illustrated example synchronizes to an AC period of a received input power signal. The line synchronizer 230 receives an input from the PFC input receiver 210 and transmits an output to the PFC disable controller. In the illustrated example, the line synchronizer is a timing circuit that synchronizes an output to the period of an input. In the illustrated example, the timing circuit is at least one comparator that compares the input AC voltage to a reference voltage. When the input AC voltage is greater than, or alternatively lesser than, the reference voltage, the timing circuit outputs a signal indicating that. In effect, the comparator creates pulses indicative of alternating (e.g., positive and/or negative) periods of the AC signal. Further, the timing circuit might include other components such as, for example, a memory device, an oscillator, etc. Including such additional components may enable the timing circuit to output pulses indicative of the start of an AC period.

Additionally or alternatively, the line synchronizer 230 might indicate the start of periods of alternating sign of the AC voltage. In the illustrated example, the line synchronizer 230 receives and synchronizes to input indicative of un-rectified power provided by the AC source 130. However, the line synchronizer 230 might receive and synchronize to input indicative of rectified power provided by the AC source 130. The rectified signal of the AC source 130 might be rectified by, for example, a full bridge rectifier; and the frequency of the rectified power might be twice the frequency of the un-rectified power of the AC source 130. In another example, the line synchronizer 230 could be another component such as, for example, a voltage-controlled oscillator, a crystal oscillator, a phase locked loop, etc.

The PFC disable controller 240 of the illustrated example controls whether the power factor corrector 105 corrects the power factor of the power provided to the load by selectively enabling and/or disabling the power factor corrector 105 via the power factor correction enable 110. The PFC disable controller 240 causes the power factor corrector 105 to become disabled for at least one AC period when the power factor requires cycle-skipping. The AC period is synchronized by the line synchronizer 230, and is an input received by the PFC disable controller 240. When the power factor corrector 105 is disabled, power provided to the load is comprised of power that was stored within the power factor corrector 105. Further, the PFC disable controller 240 of the illustrated example receives inputs from the light-load detector 260 and the mode controller 250.

The mode controller 250 of the illustrated example outputs a control signal to the PFC disable controller 240 and receives inputs from the PFC input receiver 210 and the PFC output receiver 220. The mode controller 250 of the illustrated example provides a control signal to the power factor corrector 105 via the power factor correction disable controller 240.

In the illustrated example, the mode controller 250 ensures that current flowing through the power factor corrector 105 is in phase with the input voltage provided to the power factor corrector 105. This phase correction is related to the displacement power factor described above. In the illustrated example, the mode controller 250 is a fixed frequency continuous conduction mode controller. However, the mode controller 250 may additionally or alternatively be a transition mode controller, a discontinuous mode controller, etc.

The light-load detector 260 of the illustrated example analyzes the input power signal and determines if light-load conditions exist. The light-load detector 260 receives inputs from the PFC input receiver 210 and the PFC output receiver 220, and provides an output to the PFC disable controller 240. Cycle-skipping may be required when, for example, the observed power is low. When the light-load detector 260 detects that light-load conditions exist, the light-load detector 260 transmits a signal to the PFC disable controller 240 to disable power factor correction.

Figure 3:
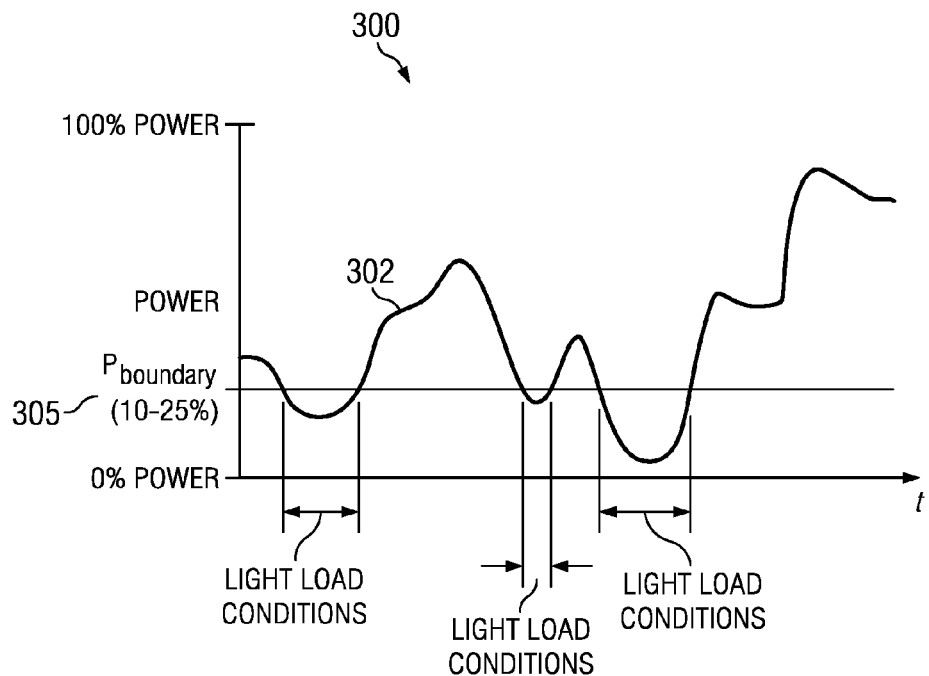
FIG. 3 is a diagram of an example power output over time by the power factor correction system of FIGS. 1 and 2.
Figure 4:
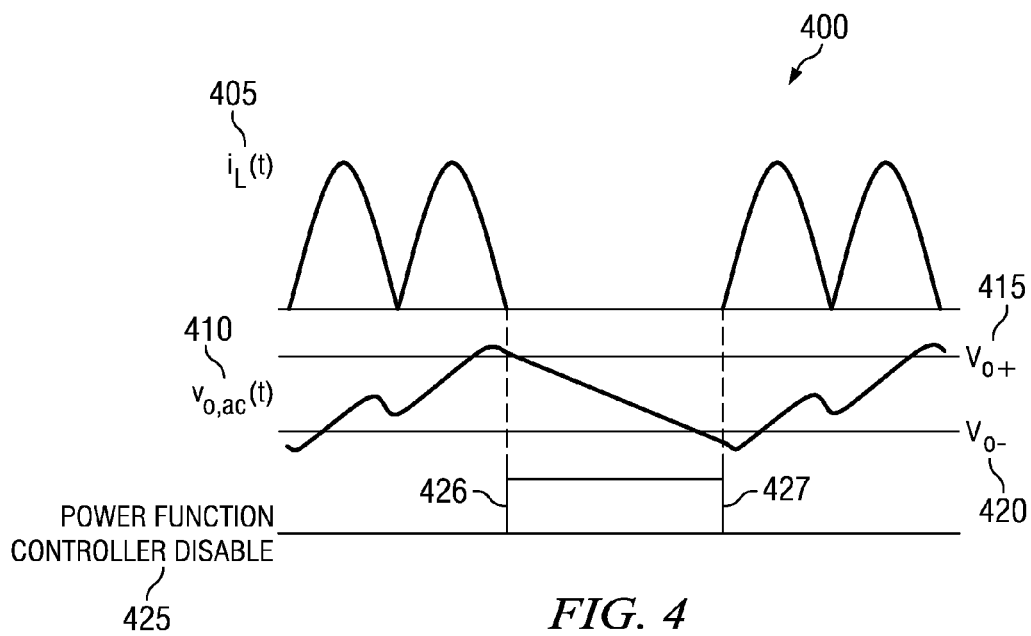
FIG. 4 is a diagram illustrating a cycle-skipping sequence performed by the power factor correction controller of FIGS. 1 and 2.

FIG. 3 is a diagram 300 of an example power factor correction boundary 305 that may be implemented by the power factor correction controller 115 of FIGS. 1 and 2. The diagram 300 illustrates a change in power 302 drawn by a load over time. The horizontal axis of the diagram 300 represents time, and the vertical axis of the diagram 300 represents power output by the power factor correction system 100. The power factor correction boundary 305 represents the light-load boundary implemented by the power factor correction controller 115. The power factor correction boundary 305 is typically between 10 and 25 percent of the maximum power output by the power factor correction system 100. However, any other limit may be used for the power factor correction boundary 305. For example, the limit might be anything below one third of the maximum power output by the power factor correction system 100. Further, the power factor correction boundary 305 may change over time and alternatively may be configurable based on, for example, the load 150. When the power 302 output by the power factor correction system 100 is below the power factor correction boundary 305, light-load conditions are present, and the power factor correction system 100 reacts by implementing cycle-skipping as illustrated in FIG. 4. In the illustrated example, the power 302 output by the power factor correction system 100 changes over time. In some instances, the power 302 is high (e.g., near the maximum output power), while at other times, the power 302 is low (e.g., nearly no power output to the load). In the illustrated example, the power 302 crosses below the power factor correction boundary 305 for short periods of time. However, the power 302 may remain in any state (whether above or below the power factor correction boundary 305) for any period of time.

FIG. 4 is a diagram 400 illustrating a cycle-skipping sequence performed by the power factor correction controller 115 of FIGS. 1 and 2. The diagram 400 illustrates components of the power output to the load from the power factor correction system 100.

In particular, the diagram illustrates a rectified input current 405 and an output voltage 410. The input current 405 shows a rectified current provided to the load 150. The output voltage 410 is bounded by an upper voltage limit 415 and a lower voltage limit 420. Further, the diagram 400 includes a power factor correction disable signal 425.

Initially, the power factor correction disable signal 425 is low, resulting in the power factor corrector being enabled and power being transferred to the load 150. When the output voltage 410 is above the upper voltage limit 415 and at a zero-crossing of the input current 405, the power factor correction disable signal 425 becomes active, and the power factor corrector is disabled 426. Power that is being provided to the load is then sourced from stored energy of the power factor corrector. The voltage 410 decreases based on the power drawn by the load. When the output voltage 410 is below the lower voltage limit 420, at a zero-crossing of the input current 405 the power factor correction disable signal 425 becomes inactive 427, and the power factor corrector is enabled.

When a load is light (e.g., below the light-load power boundary described in connection with FIG. 3), the power stored in the power factor corrector will decline slowly until the voltage is lower than the lower voltage limit 420. When the load is not light, the power stored in the power factor corrector will decline more quickly. The time required for the output voltage 410 to decrease to the lower voltage threshold 420 is proportional to the lightness of the load. Thus, in some examples, there may be one period where the power factor corrector is disabled, while in some other examples, there may be many periods where the power factor corrector is disabled.

Changing the state of the power factor disable signal 425 at zero-crossings of the input current 405 ensures no effect on the THD. Switching at a time other than a zero-crossing introduces additional harmonics to be added to the signal, thus reducing the power factor. Further, in the illustrated example, the input current 405 is rectified and shows two zero-crossings for every AC period.

In the illustrated example, alternating zero-crossings are used to ensure that no DC bias is introduced. Because periods of the power provided to the load are modulated as complete units, this is known as period enabling modulating. Positive periods of the AC power might create a positive DC bias, while negative periods of the AC power might create a negative DC bias. However, enabling and/or disabling the power factor correction disable signal 425 on half cycles could lead to a finer resolution in output. For example, when switching on half cycles, the difference between the lower voltage limit 420 and the upper voltage limit 415 might be reduced. To reduce DC bias, alternating periods of the AC signal might be used to keep the DC bias as close to zero as possible.

Figure 5:
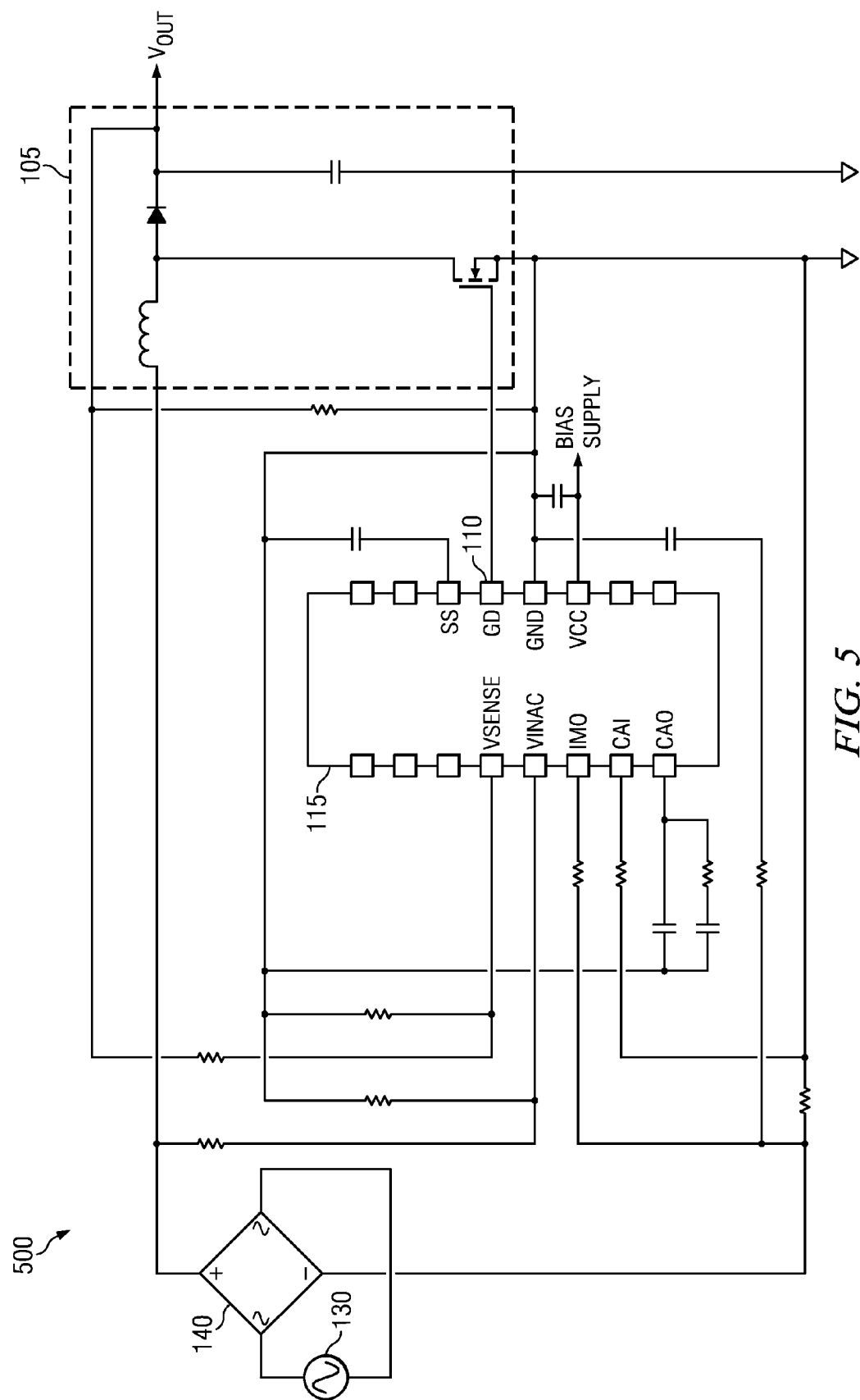
FIG. 5 is an example schematic for the power factor corrector and power factor correction controller of the example power factor correction system of FIG. 1.

FIG. 5 is an example schematic 500 for the power factor corrector 105 and power factor correction controller 115 of the example power factor correction system 100 of FIG. 1. The example schematic 500 illustrates a circuit diagram that may be used to implement the example power factor correction system 100. As in FIGS. 1 and 2, the example schematic includes the power factor corrector 105, the power factor correction controller 115, and an enable line between the power factor corrector 105 and the power factor correction controller 115. Additionally, the example schematic 500 shows the AC source 130 and the rectifier 140.

In the illustrated example, the rectifier 140 is represented by a full bridge rectifier; however any other type of rectifier may additionally or alternatively be used. Further, in the illustrated example, discrete components (e.g., resistors, capacitors, traces, etc.) are used to join inputs and outputs from the AC source 130, the rectifier 140, the power factor correction controller 115, and the power factor corrector 105. However, any other method of interconnecting components may additionally or alternatively be used.

The power factor corrector 105 of the illustrated example is implemented by an inductor, a diode, a transistor, and a capacitor. However any other method of correcting a power factor may additionally or alternatively be used. For example, the power factor corrector 105 may be implemented by banks of capacitors and or inductors connected to relays to correct the power factor of the output power.

The power factor correction controller 115 of the illustrated example is implemented by an integrated circuit having sixteen pins. However, any number of pins may be used. For example, the power factor correction controller 115 may have eight pins, twenty pins, etc. Further, in the illustrated example, the power factor correction controller 115 of the illustrated example is a small outline integrated circuit (SOIC), however any other form factor integrated circuit may additionally or alternatively be used. For example, a thin shrink small outline package (TSSOP), or a plastic dual inline package (PDIP) may alternatively be used. Further, while in the illustrated example, the power factor correction controller 115 is an application specific integrated circuit (ASIC), the power factor correction controller 115 may be any other type of computing and/or processing device. For example, the power factor correction controller 115 may be implemented by a digital signal processor (DSP), a field programmable gate array (FPGA), a microprocessor, etc.

Figure 5A:
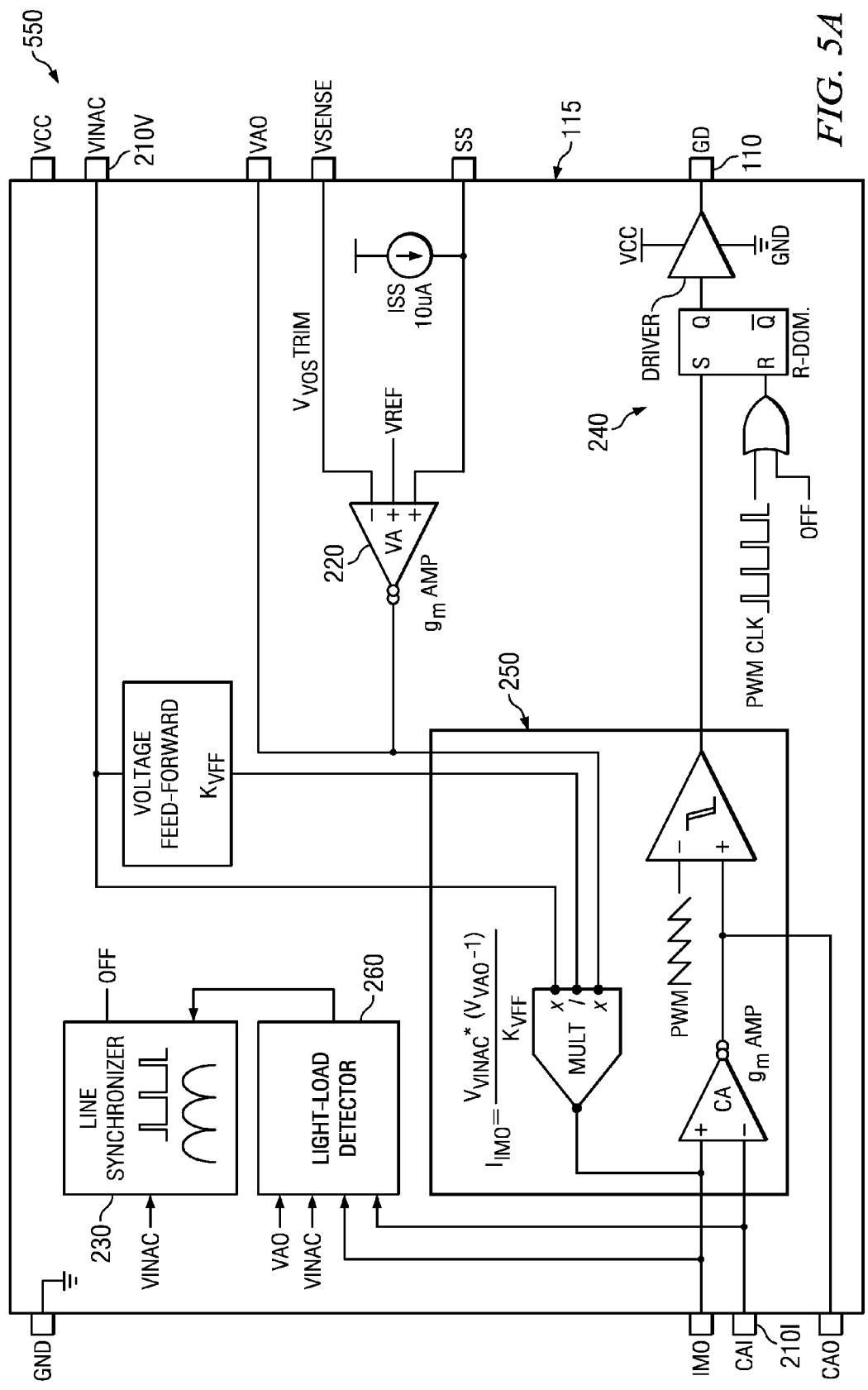
FIG. 5A is an example schematic for the power factor correction controller of the example power factor correction system of FIG. 1.

FIG. 5A is an example schematic 550 for the power factor correction controller 115 of the example power factor correction system 100 of FIG. 1. The example schematic 550 illustrates a circuit diagram that may be used to implement the example power factor correction controller 115. As shown in FIG. 2, the example schematic includes the PFC input receiver 210, the PFC output receiver 220, the line synchronizer 230, the PFC disable controller 240, the mode controller 250, and the light-load detector 260.

In the illustrated example, the PFC input receiver 210 is shown as a voltage input 210V (shown as VINAC) and a voltage input 210I (shown as CAI). The voltage input 210I of the illustrated example receives a voltage that is proportional to a current that is flowing through the power factor corrector 105. The voltage input 210V provides an input to the mode controller 250 and minimizes any phase shift component associated with the received input. Further, the voltage input 210V is provided to the line synchronizer 230 and the light load detector. While in the illustrated example the PFC input receiver 210 is shown as two voltage inputs, any other type of inputs may additionally or alternatvely be used. For example, the PFC input receiver 210 might include an operational amplifier to amplify the input; a resistor, an inductor, and/or a capacitor to filter the input; etc.

The PFC output receiver 220 of the illustrated example is shown as an operational amplifier that receives inputs from a reference voltage, a sensed voltage, and/or a soft-start voltage may be used. However, alternative implementations may use other circuitry. The PFC output receiver 220 of the illustrated example generates an output proportional to a difference between the sensed voltage and the reference voltages or the soft-start voltage (whichever is lower).

In the illustrated example, the line synchronizer 230 is a timing circuit that synchronizes an output to the period of an input. In the illustrated example, the line synchronizer 230 is one or more comparators that compare the input AC voltage to a reference voltage. In turn, the comparators create an output indicative of the start of an AC period. Additionally or alternatively, the line synchronizer 230 might indicate the start of periods of alternating sign of the AC voltage. The output of the line synchronizer 230 is passed to the PFC disable controller 240. In the illustrated example, the line synchronizer 230 receives an input from the light load detector 250. However, in some examples, the line synchronizer 230 might not receive an input from the light load detector 250. When the input from the light load detector 250 indicates that light load conditions exist, the line synchronizer 230 enables and/or disables the power factor corrector 105 in synchronization with the line voltage.

In the illustrated example, the line synchronizer 230 receives and synchronizes to input indicative of power provided by the AC source 130 via the PFC input receiver 210V. However, the line synchronizer 230 might receive and synchronize to input indicative of rectified power provided by the AC source 130. The rectified power of the AC source 130 might be rectified by, for example, a full bridge rectifier; and the frequency of the rectified power might be twice the frequency un-rectified power of the AC source 130. In some examples, the line synchronizer 230 is an oscillator such as, for example, a voltage-controlled oscillator, a crystal oscillator, a phase locked loop, etc.

In the illustrated example, the PFC disable controller 240 is shown as a Set-Reset latch coupled with a gate driver. The PFC disable controller 240 controls the signal provided to the power factor corrector 105 via the power factor correction enable 110. In alternative implementations, other circuitry may additionally or alternatively be used to control the signal provided to the power factor corrector 105. For example, an operational amplifier utilizing a switched feedback circuit might be used.

The mode controller 250 of the illustrated example includes a multiplier, a current amplifier, and a comparator. However, some example implementations may use additional or alternative components. The mode controller of the illustrated example receives input signals from the PFC input receiver 210 (e.g., the voltage input 210V and/or the voltage input 210I), a voltage feed-forward circuit, reference voltages, and the output of the PFC output receiver 220. The mode controller 250 of the illustrated example processes the received inputs and provides an output to the PFC disable controller 240. Additionally or alternatively, other circuitry might be used to create the output to the light-load detector 260.

The light-load detector 260 of the illustrated example analyzes the input power signal and determines if light-load conditions exist. The light-load detector 260 receives inputs from the PFC input receiver 210V and 210I (shown as VINAC and CAI), and the PFC output receiver 220 (shown as VAO), and provides an output to the line synchronizer 230. When the light-load detector 260 detects that light-load conditions exist, the light-load detector 260 transmits a signal to the PFC disable controller 240 via the line synchronizer 230 to disable the power factor corrector 105 via the power factor correction enable 110.

While an example manner of implementing the power factor correction system 100 of FIG. 1 has been illustrated in FIGS. 2, 3, 4, 5, and 5A, one or more of the elements, processes and/or devices illustrated in FIGS. 2, 3, 4, 5, and 5A may be combined, divided, re-arranged, omitted, eliminated and/or implemented in any other way. Further, the example power factor corrector 105, the example power factor correction controller 115, the PFC input receiver 210, the example PFC output receiver 220, the example line synchronizer 230, the example PFC disable controller 240, the example mode controller 250, the example light-load detector 260, and/or, more generally, the example power factor correction system 100 of FIGS. 1 and 2 may be implemented by hardware, software, firmware and/or any combination of hardware, software and/or firmware. Thus, for example, any of the example power factor corrector 105, the example power factor correction controller 115, the example PFC input receiver 210, the example PFC output receiver 220, the example line synchronizer 230, the example PFC disable controller 240, the example mode controller 250, the example light-load detector 260, and/or, more generally, the example power factor correction system 100 of FIGS. 1 and 2 may be implemented by one or more circuit(s), programmable processor(s), application specific integrated circuit(s) (ASIC(s)), programmable logic device (s) (PLD(s)) and/or field programmable logic device(s) (FPLD(s)), etc. When any of the appended apparatus claims are read to cover a purely software and/or firmware implementation, at least one of the example power factor corrector 105, the example power factor correction controller 115, the PFC input receiver 210, the example PFC output receiver 220, the example line synchronizer 230, the example PFC disable controller 240, the example mode controller 250, and/or the example light-load detector 260 are hereby expressly defined to include a computer-readable medium such as a memory, DVD, CD, etc. storing the software and/or firmware. Further still, the example power factor correction system 100 of FIGS. 1 and 2 may include one or more elements, processes and/or devices in addition to, or instead of, those illustrated in FIGS. 1 and 2, and/or may include more than one of any or all of the illustrated elements, processes and devices.

Figure 6:
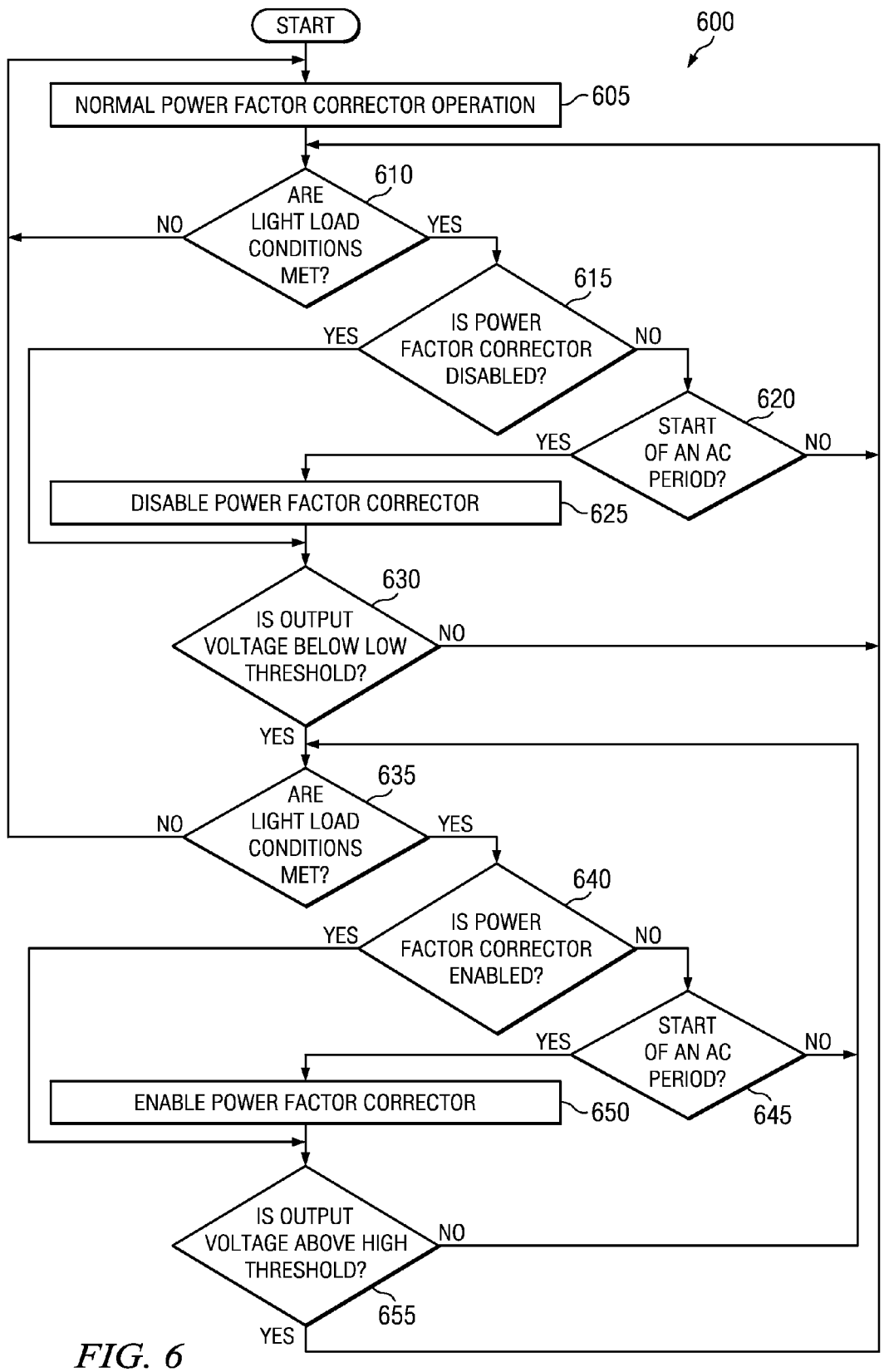
FIG. 6 is a flowchart representative of a process that may be used to implement the example power factor correction controller of FIG. 1.

A flowchart representative of an example process for implementing the example power factor correction controller 115 of FIGS. 1 and 2 is shown in FIG. 6. In the examples illustrated above, the example power factor correction controller 115 of FIGS. 1 and 2 is an integrated circuit implementing the process shown in FIG. 6. However, the power factor correction controller 115 might be a device capable of executing machine-readable instructions implementing the process shown in FIG. 6. In such examples, the machine-readable instructions comprise a program for execution by a processor such as the processor 712 shown in the example computer 800 discussed below in connection with FIG. 7. The program may be embodied in software stored on a computer-readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example power factor correction system 100 may alternatively be used. For example, the order of execution of the blocks may be changed, and/or some of the blocks described may be changed, eliminated, or combined.

FIG. 6 is a flowchart representative of a process that may be used to implement the example power factor correction controller 115 of FIG. 1. The example process instructions 600 begin execution when the power factor corrector 105 operates normally. The PFC disable controller 240 sets power factor correction enable 110 to enable the power factor corrector 105 (block 605). Next, the PFC disable controller 240 receives input from the light-load detector 260 to determine if light-load conditions are met (block 610). If light-load conditions are not met, the output of the PFC disable controller 240 (the power factor correction enable 110) remains enabled. If light-load conditions are met, the PFC disable controller 240 determines if the power factor corrector 105 is disabled (block 615). If the power factor corrector 105 is not disabled, the PFC disable controller 240 determines if the current input state is the beginning of an AC period by receiving an input from the line synchronizer 230 (block 620). As described in connection with FIG. 4, the beginning and/or start of the AC period in the illustrated example is based on the un-rectified AC signal. However, additionally or alternatively, the beginning and/or start of the AC period might be based on the rectified AC signal. If the power factor corrector 105 is disabled, control proceeds to block 630. If the current input state is not the beginning of an AC period, control returns to block 610. Assuming the light-load conditions and power factor corrector 105 enabled/disabled state have not changed, in effect the PFC disable controller 240 waits for the start of an AC period. Upon the start of the AC period, the PFC disable controller 240 disables the power factor corrector 105 via the power factor correction enable 110 (block 625). Control then proceeds to block 630. At block 630, the PFC disable controller 240 determines if the output voltage is below a low threshold by inspecting the input received from the mode controller 250. If the output voltage is not below the low voltage threshold 420, control returns to block 610. If the output voltage is below the low voltage threshold 420, control proceeds to block 635.

Next, the PFC disable controller 240 determines if light-load conditions are met by evaluating the input received from the light-load detector 260 (block 635). If light-load conditions are not met, control proceeds to block 605. If light-load conditions are met, the PFC disable controller 240 proceeds to determine if the power factor corrector 105 is disabled (block 640). If the power factor corrector 105 is enabled, control proceeds to block 655. If the power factor corrector 105 is not enabled, the PFC disable controller 240 determines if the current input state is the beginning of an AC period (block 645). If the current input state is not the beginning of the AC period, control proceeds to block 635. Again, assuming that the light-load conditions and the power factor corrector 105 enabled/disabled state do not change, the PFC disable controller 240 in effect proceeds to wait until the start of an AC period. Upon the start of the AC period, the PFC disable controller 240 enables the power factor corrector 105 via the power factor correction enable 110 (block 650), and control proceeds to block 655. At block 655, the PFC disable controller 240 determines if the output voltage is above a high threshold 415. If the output voltage is not above the high threshold 415, control proceeds to block 635. If the output voltage is above the high threshold 415, control proceeds to block 610.

As mentioned above, the example process of FIG. 6 may be implemented using coded instructions (e.g., computer-readable instructions) stored on a tangible computer-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example process of FIG. 6 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

Figure 7:
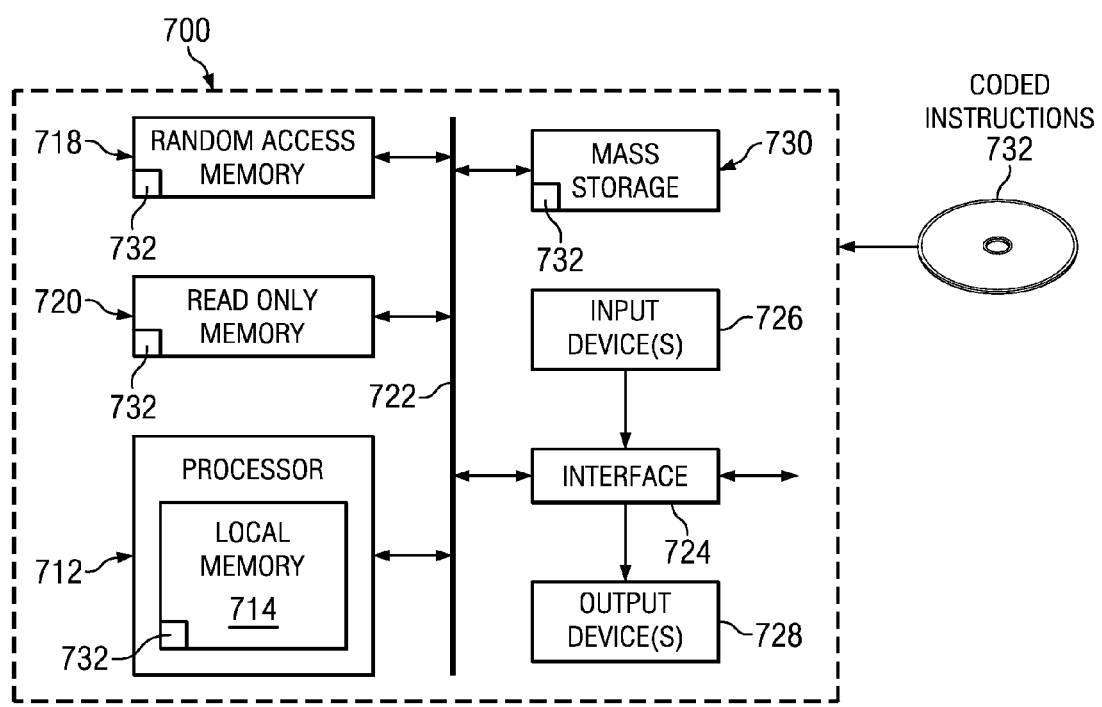
FIG. 7 is a block diagram of an example processor system that may execute, for example, machine-readable instructions implementing the process of FIG. 6.

FIG. 7 is a block diagram of an example computer 700 capable of executing the instructions of FIG. 6 to implement the power factor correction controller 115 of FIGS. 1 and 2. The computer 700 can be, for example, a server, a personal computer, a mobile device (e.g., a cellular phone), or any other type of computing device.

The system 700 of the instant example includes a processor 712. For example, the processor 712 can be implemented by one or more microprocessors or digital controllers. Other processors may also be appropriate.

The processor 712 is in communication with a main memory 714 including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 714 is typically controlled by a memory controller (not shown).

The computer 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device (e.g., the request servicer 310) such as a modem or network interface card to facilitate exchange of data with external computers via a network (e.g., an Ethernet connection, a digital subscriber line (DSL), a telephone line, coaxial cable, a cellular telephone system, etc.).

The computer 700 also includes one or more mass storage devices 730 for storing software and data. Examples of such mass storage devices 730 include floppy disk drives, hard drive disks, compact disk drives, and digital versatile disk (DVD) drives.

The coded instructions 732 of FIGS. 4 and 5 may be stored in the mass storage device 730, in the volatile memory 718, in the non-volatile memory 720, in the local memory 714, and/or on a removable storage medium such as a CD or DVD. The coded instructions of FIG. 7 may be stored in the mass storage device 728, in the volatile memory 714, in the non-volatile memory 716, and/or on a removable storage medium such as a CD or DVD.

From the foregoing, it will be appreciated that the above disclosed methods and apparatus allow for improved power factors when delivering electricity to a load.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to correct a power factor comprising:
    detecting power provided to a power factor corrector at a line frequency;
    detecting power provided by the power factor corrector; and
    disabling the power factor corrector from correcting the power factor of a load for at least one period of the line frequency when the power provided by the factor corrector is below a predetermined light-load threshold;
    further comprising synchronizing a timing circuit to a period of a line frequency power provided by the power factor corrector, wherein the power factor corrector is disabled at a start of a synchronized period.

2. The method as described in claim 1, further comprising enabling the power factor corrector to correct the power factor of the load when the power provided by the power factor corrector is above the predetermined light-load threshold.

3. The method as described in claim 1, wherein the power factor corrector is enabled after being disabled for the at least one synchronized period.

4. The method as described in claim 3, wherein the power factor corrector is re-enabled at the start of the at least one synchronized period.

5. The method as described in claim 1, wherein disabling the power factor corrector further comprises determining if a voltage provided by the power factor corrector is above an upper reference voltage.

6. The method as described in claim 1, wherein the power factor corrector is re-enabled when a voltage provided by the power factor corrector is below a lower reference voltage at the start of the synchronized period.

7. The method as described in claim 1, wherein the power provided by the power factor corrector is provided to the load.

8. The method as described in claim 1, wherein when the power factor corrector is disabled from correcting the power factor of the load, energy stored in the power factor corrector is supplied to the load.

9. An apparatus to correct a power factor comprising:
    a line synchronizer to synchronize to a period of a line frequency received input power signal;
    an input power receiver to receive the input power signal;
    an output power receiver to receive an output power signal from a load of a power factor corrector;
    a mode controller to process the input power signal and the output power signal to control the power factor corrector;
    the power factor corrector to, when enabled, correct the power factor of the load;
    a light-load detector to analyze the input power signal and the output power signal, and to determine if the power factor corrector requires cycle skipping of the received line frequency power; and
    a power factor correction disabler to cause the power factor corrector to become disabled for the period synchronized by the line synchronizer when the power factor requires cycle-skipping, wherein the power factor correction disabler disables power factor correction when the power output to the load from the power factor corrector is below a light-load threshold.

10. The apparatus as described in claim 9, wherein the light-load threshold is less than fifty percent of the maximum power output by the power factor corrector.

11. The apparatus as described in claim 9, wherein the line synchronizer comprises a comparator to compare a voltage of the received input power signal to a reference voltage.

12. The apparatus of claim 11, wherein the period synchronized by the line synchronizer occurs between rising edges of when the voltage of the received input power signal is greater than the reference voltage.

13. The apparatus of claim 11, wherein the period synchronized by the line synchronizer occurs between falling edges of when the voltage of the received input power signal is greater than the reference voltage.

14. A method of correcting a power factor comprising:
   detecting alternating current (AC) power at a line frequency provided by a power factor corrector;
   period enabling modulating the AC power provided by the power factor corrector when the power provided is below a light-load threshold, wherein period enabling modulating the AC power further comprises disabling the power factor corrector from providing power for at least one period of the line frequency AC power provided by the power factor corrector and is synchronized to the start of a period of the AC power.

15. The method as described in claim 14, wherein the AC power provided by the power factor corrector is provided to a load.

16. The method as described in claim 14, wherein during the disabled period, power stored in the power factor corrector is provided to the load.

17. The method as described in claim 14, wherein period enabling modulating the AC power further comprises re-enabling the power factor corrector to provide power when the power provided to the load is below a lower voltage limit.

18. The method as described in claim 14, wherein disabling the power factor corrector from providing power occurs when the power provided to the load is above an upper voltage limit.

* * * * *